United States Patent
Lyudovyk et al.

(10) Patent No.: US 6,625,600 B2
(45) Date of Patent: Sep. 23, 2003

(54) METHOD AND APPARATUS FOR AUTOMATICALLY PROCESSING A USER'S COMMUNICATION

(75) Inventors: Yevgenly Lyudovyk, Las Cruces, NM (US); Esther Levin, Livingston, NJ (US)

(73) Assignee: Telelogue, Inc., Iselin, NJ (US)

( * ) Notice: Subject to any disclaimer, the term of this patent is extended or adjusted under 35 U.S.C. 154(b) by 364 days.

(21) Appl. No.: 09/845,360

(22) Filed: May 1, 2001

(65) Prior Publication Data

US 2002/0152207 A1 Oct. 17, 2002

Related U.S. Application Data

(60) Provisional application No. 60/283,182, filed on Apr. 12, 2001.

(51) Int. Cl.⁷ .......................... G06F 17/30; G10L 15/00
(52) U.S. Cl. ...................... 707/6; 707/3; 707/4; 707/5; 704/239; 704/240; 704/251
(58) Field of Search ............................. 707/3, 4, 5, 6; 704/239, 240, 251; 379/88–89

(56) References Cited

U.S. PATENT DOCUMENTS

| | | |
|---|---|---|
| 3,928,724 A | 12/1975 | Byram et al. |
| 4,608,460 A | 8/1986 | Carter et al. |
| 4,650,927 A | 3/1987 | James |
| 4,674,112 A | 6/1987 | Kondraske et al. |
| 4,915,546 A | 4/1990 | Kobayashi et al. |
| 4,979,206 A | 12/1990 | Padden et al. |
| 5,052,038 A | 9/1991 | Shepard |
| 5,087,913 A * | 2/1992 | Eastman ............ 341/95 |
| 5,131,045 A | 7/1992 | Roth |
| 5,203,705 A | 4/1993 | Hardy et al. |
| 5,214,689 A | 5/1993 | O'Sullivan |
| 5,218,536 A | 6/1993 | McWherter |
| 5,253,599 A | 10/1993 | Hashiride |
| 5,255,310 A | 10/1993 | Kim et al. |
| 5,261,112 A | 11/1993 | Futatsugi et al. |

(List continued on next page.)

FOREIGN PATENT DOCUMENTS

| | | |
|---|---|---|
| WO | 88/02965 | 4/1988 |
| WO | 89/00793 | 1/1989 |

OTHER PUBLICATIONS

Aldefeld, et al., "Automated directory Listing Retrieval System Based on Isolated Word Recognition," *Proceedings of the IEEE*, vol. 68, No. 11, pp. 1364–1379 (Nov. 1980).

(List continued on next page.)

*Primary Examiner*—Frantz Coby
(74) *Attorney, Agent, or Firm*—Kenyon & Kenyon (57) ABSTRACT

The invention concerns a method and apparatus for processing a user's communication. The invention may include receiving a list of recognized symbol strings of one or more recognized entries. The list of recognized symbol strings may include a first similarity score associated with each recognized entry. From each recognized symbol string one or more contiguous sequences of N-symbols may be extracted. One of the extracted contiguous sequences of N-symbols may be matched with at least one stored contiguous sequence of N-symbols from a first database. A preliminary set of symbol strings and associated second similarity scores may be generated. The preliminary set of symbol strings may include one or more stored symbol strings from a second database that correspond to the at least one matched contiguous sequence of N-symbols. A third similarity score associated with the one or more stored symbol strings included in the preliminary set of symbol strings may be computed. A refined set of symbol strings from the preliminary set of symbol strings based on the computed third similarity score may be output.

66 Claims, 4 Drawing Sheets

U.S. PATENT DOCUMENTS

| | | | |
|---|---|---|---|
| 5,333,317 A | | 7/1994 | Dann |
| 5,418,951 A | | 5/1995 | Damashek .................. 395/600 |
| 5,457,770 A | | 10/1995 | Miyazawa |
| 5,479,489 A | | 12/1995 | O'Brien |
| 5,621,857 A | | 4/1997 | Cole et al. |
| 5,623,578 A | | 4/1997 | Mikkilineni |
| 5,634,055 A | * | 5/1997 | Barnewall et al. ...... 707/103 R |
| 5,638,425 A | | 6/1997 | Meador, III et al. |
| 5,724,593 A | | 3/1998 | Hargrave, III et al. ...... 395/757 |
| 5,839,107 A | | 11/1998 | Gupta et al. |
| 5,940,825 A | * | 8/1999 | Castelli et al. .................. 707/6 |
| 5,991,714 A | | 11/1999 | Shaner ........................... 704/9 |
| 6,006,221 A | | 12/1999 | Liddy et al. .................... 707/5 |
| 6,018,736 A | | 1/2000 | Gilai et al. ..................... 707/6 |
| 6,029,167 A | | 2/2000 | Evans ........................... 707/4 |
| 6,041,299 A | * | 3/2000 | Schuster et al. ............ 704/232 |
| 6,245,982 B1 | * | 6/2001 | Suzuki et al. .................. 88/477 |
| 6,252,988 B1 | | 6/2001 | Ho ............................... 283/229 |
| 6,256,630 B1 | | 7/2001 | Gilai et al. |
| 6,269,368 B1 | | 7/2001 | Diamond ........................ 707/6 |
| 6,286,006 B1 | | 9/2001 | Bharat et al. ............... 707/100 |
| 6,397,205 B1 | | 5/2002 | Juola .............................. 707/2 |
| 6,499,029 B1 | * | 12/2002 | Kurapati et al. ............... 707/5 |

OTHER PUBLICATIONS

Colangelo, et al., "Directory Assistance for the Visually Impaired," *IEEE Proceedings*, pp. 1168–1171 (1989).

Fast et al., "Dialing a Name: Alphabetic Entry through a telephone Keypad," *SIGCHI Bulletin*, vol. 20, No. 2, p. 34. (1998).

Glowacz, "RBOCs Vocalize Operator Services, *Telephone Engineer and Management*," vol. 95 No. 7, pp. 25–27, 30. (Apr. 1991).

Hall, et al., "Approximate String Matching," Computer Surveys, vol. 12 No. 4, pp. 381–402 (1980).

Holmgren, "Toward Bell System Application o Automatic Speech Recognition ", *The Bell System Technical Journal*, pp. 1865–1880 (1983).

Jack, et al., "Design and Evaluation of Automated Telephone Services,"*IEE.Colloquium*, pp. 6/1–6/4 (1992).

Klatt, "Review of text–to–speech conversion for English," *Journal of the Acoustical Society of America*, vol. 82, No. 3, pp. 737–793 (1987).

Lennig, "Putting Speech Recognition to Work in the Telephone Network," IEEE, pp. 35–41 (Aug. 1990).

Myers, et al., "An automated directory listing retrieval system based on recognition of connected letter strings," *Journal of the Acoustical Society of America*, vol. 71, No. 3, pp. 716–727 (1982).

Ohyama, "A Knowledge–based Director Assistance System," *Future Generation Computer Systems*, vol. 5, pp. 109–117 (1989).

Pelton,"Designing the Telephone Interface for Voice Processing Applications," *Speech Technology*, vol. 5, No. 1, pp. 18–21 (1989).

Rabiner, et al., "Fundamentals of Speech Recognition, "*Prentice Hall*, pp. 43–52 (1993).

Salomaa, "Computation and Automata,", Cambridge University Press, pp. 44–55 (1985).

Schalk, "Automating Operator–Assisted Calls Using Speech Recognition," *Voice Control Systems*, pp. 441–444.

Tremblay, et al., "An Introduction to data Structure with Applications," *McGraw–Hill*, pp. 316–318 (1976).

Veith, "Operator Assisted Services with Automated Responses," *Audiotex—New Opportunities in Voice Services*, pp. 19–28 (19860.

Veith, "Information Retrieval via Telephone Keypad and Voice: Experience with telephone Directories," *National Online Meeting Proceedings*, pp. 443–451 (1990).

Vitale, An Algorithm for High Accuracy name Pronunciation by Parametric Speech Synthesizer, *Computational Linguistics*, vol. 17, No. 3, pp. 257–276 (1991).

* cited by examiner

METHOD AND APPARATUS FOR AUTOMATICALLY PROCESSING A USER'S COMMUNICATION

CROSS-REFERENCED TO RELATED PATENT APPLICATION

This patent application claims benefit of U.S. Provisional Patent Application Ser. No. 60/283,182 filed Apr. 12, 2001.

FIELD OF THE INVENTION

The present invention relates to automatically processing a user's communication. In particular, the present invention relates to method and apparatus for automatically recognizing and/or processing possibly erroneous or incomplete user's communication.

BACKGROUND OF THE INVENTION

In recent years, automated attendants have become very popular. Many individuals or organizations use automated attendants to automatically provide information to callers or to route incoming calls. Typically, a user places a call and reaches an automated attendant (e.g. an Interactive Voice Recognition (IVR) system) that prompts the user for desired information and searches an informational database for the requested information. The user enters the request, for example, a name of a business or individual via a keyboard, keypad or spoken inputs. The automated attendant searches for a match based on the user's input and outputs a result if a match can be found.

However, in these conventional systems, if the automated attendant is unable to find a suitable match in its database or if the user is unsatisfied with the results, the user is connected to an operator for further assistance. This process can be time consuming and a user may become frustrated if he or she does not have the exact name of the business for which the additional information, such as a telephone number, is desired. In other words, if the user has a partial or erroneous name of the business, then the user may not be able to quickly find the desired information or may not find the requested information at all. This scenario results in either wasted time or a lost business opportunity for the both the user and the intended business.

SUMMARY OF THE INVENTION

The invention concerns a method and apparatus for processing a user's communication. The invention may include receiving a list of recognized symbol strings of one or more recognized entries. The list of recognized symbol strings may include a first similarity score associated with each recognized entry. From each recognized symbol string one or more contiguous sequences of N-symbols may be extracted. At least one extracted contiguous sequence of N-symbols may be matched with at least one stored contiguous sequence of N-symbols from a first database. Based on those matched N-symbols and first similarity scores, a preliminary set of symbol strings and associated second similarity scores may be generated. The preliminary set of symbol strings may include one or more stored symbol strings from a second database that contain one or more matched contiguous sequences of N-symbols. A third similarity score associated with the one or more stored symbol strings included in the preliminary set of symbol strings may be computed. A refined set of symbol strings from the preliminary set of symbol strings based on the computed third similarity score may be output.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

Embodiments of the present invention relate to a method and apparatus for automatically recognizing and/or processing a user's communication. In some cases, the user's communication may be erroneous or incomplete, but in other cases, the user's communication may be correct or complete. In an exemplary embodiment, the invention may utilize whole words, parts of words, or one or more contiguous sequences of symbols or characters to search one or more databases for entries that best match the user's input communication. Based on the user's communication, embodiments of the invention may reduce the volume of computations that may be required when processing, for example, a user's request for information. Accordingly, embodiments of the present invention may provide a more efficient and effective system for automatically processing the user's request with minimal external intervention.

In an exemplary embodiment of the present invention, one or more contiguous sequences of listings N-symbols (listings N-grams) may be extracted from each entry in a listings database. The entries of the listings database may be stored symbol string entries corresponding to information that may be desired by users.

In exemplary embodiments of the present invention, a user's communication is received and a ranked list of one or more recognized symbol string entries may be generated. Each recognized symbol string entry in the list may be ranked according to a corresponding first similarity score. One or more recognized contiguous sequence of N-symbols (recognized N-grams) may be extracted from each recognized symbol string entry in the list. The extracted recognized N-grams for each entry may be matched with the identical listings N-grams. In an embodiment of the present invention, for one or more database entries mapped to the matched listings N-grams, a second similarity score may be calculated. In one embodiment, the second similarity score may be used to generate a preliminary set of symbol strings that may include one or more database entries mapped to the matched listings N-grams. In embodiments of the present invention, the second similarity score can be used to further narrow the number of listings that need to be searched to generate one or more entries that may be similar or equivalent to the user's communication.

In an exemplary embodiment of the present invention, by evaluating the ranked list of recognized symbol strings with respect to the preliminary set of symbol strings, a refined set of symbol strings may be generated. The refined set of symbol strings may be generated based on associated third similarity scores. In one embodiment of the invention, entries of the refined list of symbol strings may include one or more database entries that have a favorable third similarity score.

In exemplary embodiments of the present invention, the refined set of symbol strings may be output to the user for selection. If a selection is made, corresponding information may be retrieved and presented to the user. In further embodiments of the invention, further processing may occur by evaluating the refined set of symbol strings with respect to the recognized symbol strings before an output is presented to the user.

Figure 1:
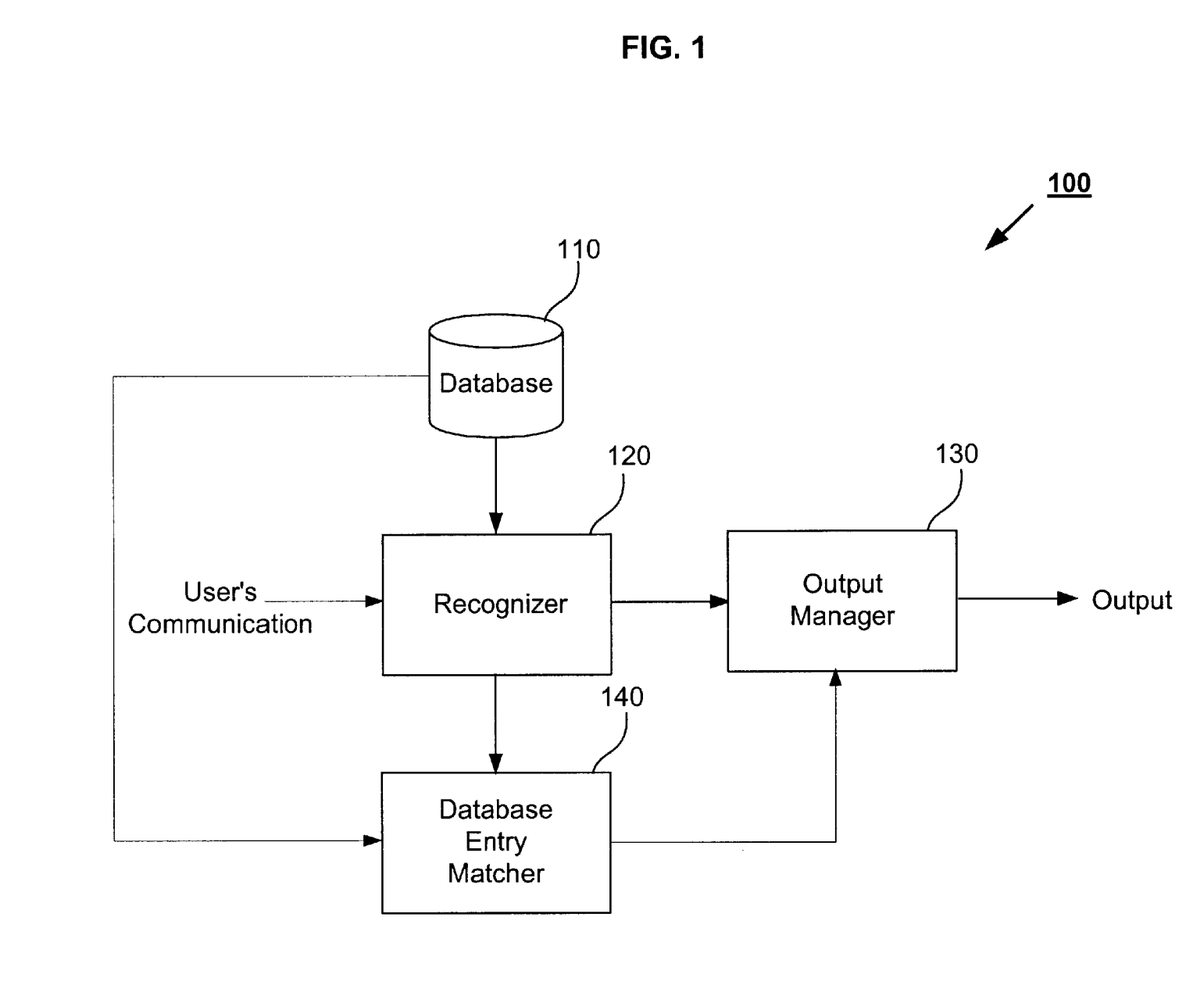
FIG. 1 is an exemplary block diagram of a communication processing system in accordance with an embodiment of the present invention.

FIG. 1 is an exemplary block diagram of a communication processing system 100 for processing a user's communication in accordance with an embodiment of the present invention. A recognizer 120 is coupled to a database 110, an output manager 130, and a database entry matcher 140.

While the examples discussed in the embodiments of the patent concern recognition of speech, the recognizer 120 may also receive a user's communication or inputs in the form of speech, text, digital signals, analog signals and/or any other forms of communications or communications signals. As used herein, user's communication can be a user's input in any form that represents, for example, a single word, multiple words, a single syllable, multiple syllables, a single phoneme and/or multiple phonemes. The user's communication may include a request for information, products, services and/or any other suitable requests.

A user's communication may be input via a communication device such as a wired or wireless phone, a pager, a personal digital assistant, a personal computer, and/or any other device capable of sending and/or receiving communications. In embodiments of the present invention, the user's communication could be a search request to search the World Wide Web (WWW), a Local Area Network (LAN), and/or any other private or public network for the desired information.

In embodiments of the present invention, the recognizer 120 may be any type of recognizer known to those skilled in the art. In one embodiment, the recognizer may be an automated speech recognizer (ASR) such as the type developed by Nuance Communications. The communication processing system 100, where the recognizer 120 is an ASR, may operate similar to an IVR but includes the advantages of a database entry matcher 140 in accordance with embodiments of the present invention. In alternative embodiments of the present invention, the recognizer 120 can be a text recognizer, optical character recognizer and/or another type of recognizer or device that recognizes and/or processes a user's inputs, and/or a device that receives a user's input, for example, a keyboard or a keypad. In embodiments of the present invention, the recognizer 120 may be incorporated within a personal computer, a telephone switch or telephone interface, and/or an Internet, Intranet and/or other type of server. In an alternative embodiment of the present invention, the recognizer 120 may include and/or may operate in conjunction with, for example, an Internet search engine that receives text, speech, etc. from an Internet user. In this case, the recognizer 120 may receive user's communication via an Internet connection and operate in accordance with embodiments of the invention as described herein.

In one embodiment of the present invention, the recognizer 120 receives the user's communication and generates a list of ranked recognized symbol strings using known methods. The symbol strings may be text or character strings that represent individual or business listings and/or other information for which the user desires additional information. In one example, the recognized symbol string may be the name of a business for which the user desires a telephone number. In an exemplary embodiment of the present invention, if a desirable match is not found in the listings database 110, recognizer may generate a list of ranked symbol strings that are similar to the user's input. Each symbol string generated by the recognizer may be a hypothesis of what was originally input by the user. Each symbol string may be ranked by associated first similarity or probability scores.

The database 110 may include a listings database that has stored symbol strings or information entries (L(listings$_{all}$)) that represent information relating to a particular subject matter. For example, the listings database may include residential, governmental, and/or business listings for a particular town, city, state, and/or country. It is recognized that the stored symbol strings L(listings$_{all}$) could represent or include a myriad of other types of information such as individual directory information, specific business or vendor information, postal addresses, e-mail addresses, etc. In embodiments of the present invention, the database 110 can be part of larger database of listings information such as a database or other information resource that may be searched by, for example, any Internet search engine when performing a user's search request.

In embodiments of present invention, the database 110 may also include a recognizer grammar list generated from the symbol strings L(listings$_{all}$) stored in the listings database. The recognizer grammar list may include, for example, a plurality different ways symbol strings stored in the listings database 110 may be referred to by users. The recognizer 120 may generate the list of recognized symbol strings and associated first similarity scores based on the recognizer grammar list stored in the database 110.

In an embodiment of the present invention, the database entry matcher 140 receives the stored symbol strings L(listings$_{all}$) and may extract one or more contiguous sequence of N-symbols (listings N-gram) for each symbol string entry stored in the database 110 (i.e., each entry of stored symbol strings L(listings$_{all}$)). The database entry matcher 140 also maps the listings N-gram with the corresponding symbol string from which it was extracted. In one embodiment, for one or more extracted listings N-grams a list of listings symbol strings containing a particular N-gram is stored as well as elementary second similarity scores. This list may be full, that is, it may include all listings symbol strings from the database containing a particular N-gram. Alternatively the list may be short, that is, the list may include only a part of all listings symbol strings from the database containing that particular N-gram. The elementary second similarity scores for a particular N-gram may be different for different listings symbol strings containing that N-gram, or the elementary second similarity scores may be the same for all listings symbol strings containing that N-gram. The use of full lists may significantly reduce the volume of computations that may be required to process a user's communication and present a more desirable search result. The use of short lists may further reduce the volume of computations. In alternative embodiments of the present invention, all of the listings N-grams may be mapped and stored with corresponding stored symbol strings entries in a master list.

In an exemplary embodiment of the present invention, the database entry matcher 140 extracts one or more recognized contiguous sequence of N-symbols (recognized N-grams) for each recognized symbol string entry in the list of recognized symbol strings generated by the recognizer 120. The database entry matcher 140 may search all of the listings N-grams to find an identical match for each of the recognized N-grams.

Based on the matched listings N-grams, the database entry matcher 140 may generate a preliminary set of symbol strings based on associated second similarity scores. Entries of the preliminary set of symbol strings include the stored symbol strings mapped to the matched N-grams.

The database entry matcher 140 may compute a third similarity score for each entry in the preliminary set of symbol strings. Based on the third similarity score, the database entry matcher 140 may generate a refined set of symbol strings. The refined set of symbol strings may typically include the best or closest match for the user's communication originally received by the recognizer 120.

The database entry matcher 140 outputs the refined set of symbol strings to the output manager 130 for processing. The output manager 130 may forward the refined set of symbol strings to the user for selection. Based on the user's selection, the output manager 130 may route a call for the user, retrieve and present additional information to the user, present another prompt to the user, terminate the call if the desired results have been achieved, or perform other steps to output a desired result for the user.

Now the database entry matcher 140 will be described in more detail with reference to the exemplary block diagram shown in FIG. 2. The database entry matcher 140 may include for example, an N-gram map generator 210, an N-gram database 240, a rough and fast matcher 220, and a refined matcher 230. The N-gram map generator is coupled to the database 110, the N-gram database 240 and the rough and fast matcher 220. The rough and fast matcher 220 is coupled to the recognizer 120 and the refined matcher 230. The refined matcher 230 is also coupled to the recognizer 120 and to the output manager 130. The term coupled as used herein implies direct or indirect coupling. The rough and fast matcher 220 is further coupled to, for example, the N-gram database 240 and the output manager 130.

In embodiments of the present invention, the N-gram map generator 210 may extract one or more listings N-grams from each of the listings in the database 210. As indicated above, for one or more extracted listings N-grams a list, for example, a full list and/or a short list of listings symbol strings containing a particular N-gram along with corresponding elementary second similarity scores may be stored, for example, in the N-gram database 240. Additionally or optionally, this mapping of N-grams to, for example, full lists or short lists may be stored in database 110. The rough and fast matcher 220 may receive a list of recognized symbol strings with associated first similarity scores. The rough and fast matcher 220 may extract from each recognized symbol string one or more recognized N-grams. The rough and fast matcher 220 may match at least one of the recognized N-grams with at least one of the listings N-grams. The rough and fast matcher 220 may further generate a preliminary set of symbol strings and associated second similarity scores. The preliminary set of symbol strings may include one or more listing from the database 210 that is mapped to the matched N-grams. The refined matcher 230 may receive the preliminary set of symbol strings and may compute a third similarity score for each listing from the database 210. The refined matcher 230 may output a refined set of symbol strings from the preliminary set of symbol strings based on the computed third similarity score.

Referring to exemplary FIG. 2, the function of each component of the database entry matcher 140 will be described in detail. During a pre-processing stage, according to an exemplary embodiment of the present invention, the N-gram map generator 210 receives the plurality of symbol strings L(listings$_{all}$) stored in the database 110. The N-gram map generator 210 may extract one or more listings N-gram from each symbol string entry stored in the database 110. In other words, from each stored symbol string entry the N-gram map generator 210 extracts contiguous sequences of N-symbols or N-characters where N can be, for example, 1, 2, 3, 4, 5, or more symbols or characters in length. A symbol as used herein can be any character, sign, mark, figure or other representation in, for example, the English language or any other language.

For example, a symbol string entry such as "Park Flowers" would yield the following N-grams ($g_k^w$) "(par", "park", "ark_", "rk_f", "k_fl", "_flo", "flow", "lowe", "ower," "wers", and "ers)". In this example, N equals "4" symbols, "(" denotes the start symbol, "_" denotes a space between words, and ")" denotes the end symbol. In other words, an imaginary window or box that is N (e.g., 4) symbols in length, for example, is placed around the symbol string entry and is moved symbol by symbol. The symbol "(" in "(par" may indicate that this is the first N-gram of the corresponding symbol string. The symbol "_" may indicate that the symbol string contains a space which implies that the symbol string is more than one word. The symbol ")" in "ers)" may indicate that this is the last N-gram of the corresponding symbol string. It is recognized that any symbol or character may be chosen to designate the beginning, end, space or other characteristic of the symbol strings.

Additionally, in the above example, "k" designates a particular symbol string entry and "w" designates the N-gram number for the particular symbol string entry. Thus, in this case, the N-grams could be designated as $g_k^1$, $g_k^2$, . . . $g_k^w$, . . . , where k=1 may designate the symbol string entry "Park Flowers" and where w=1 may designate the first N-gram "(par" for the corresponding listing.

Each listings N-gram may be stored in the N-gram database 240 and may be mapped with a list of listings symbol strings stored in the database 110 containing this N-gram and with corresponding elementary second similarity scores. This list may be full, that is, it may include all listings symbol strings from the database containing a particular N-gram. Alternatively it may be short, that is, include only a part of all listings symbol strings from the database containing that particular N-gram. The elementary second similarity scores for a particular N-gram may be different for different listings symbol strings containing that N-gram, or those scores may be the same for all listings symbol strings containing that N-gram. In one embodiment of the present invention, the N-gram map generator 210 may create one or more lists (e.g., List(g)={listing$_1$, listing$_2$, . . . listing$_k$}) created from the stored symbol strings L(listings$_{all}$). Each list List(g) may include all entries stored in the database 110 that contain a particular listings N-gram g, or it may include only a part of such entries. List(g) may be a short list and/or a full list. For example, where N-gram g="k_fl"; the list List("k_fl")={"park flowers," "greystone park florist," "normandy park florist," "shearman park florist"}. In another example, where listings N-gram g="(par"; the short list List("(par")={"paratransit services of nj", "parent training", "parfums jean jacques broussard", "park flowers", "parker family health clinic", "parsons cappiello and nardelli", "part makers inc"}.

Short lists that are subsets of full lists may be created in many ways. In one embodiment of the present invention, the number of elements in short lists may be limited to some fixed number that may be the same for all N-grams, for example, 200. Creating a short list for a particular N-gram g may be controlled by listings symbol string priorities. A listings symbol string priority may be defined as the ratio of the number of all N-grams that can be extracted from this listings symbol string and the number of short lists in which this listings symbol string has been included before the processing of this particular N-gram g. So all the listings symbol strings containing this particular N-gram g may be ordered according to their priorities, and the top predefined number, for example 200, of them may be included in the short list for this N-gram g. In embodiments of the present invention, the priorities of the included listings symbol strings may be recomputed. In additional embodiments of the present invention, the priorities may be computed as some other function of the number of all N-grams that can be extracted from this listings symbol string and the number of short lists in which this listings symbol string has been included before the processing of a particular N-gram g.

In embodiments of the present invention, each listings N-gram may be mapped to its corresponding list List(g). Each list and corresponding mapping may be stored in the N-gram database 240. Lists List(g), both full and/or short, can significantly reduce the volume of computations that may be required to process a user's communication and present a more desirable search result. In alternative embodiments of the present invention, computations can be further reduced by creating sub-lists of the listings database that contain information related to a particular subject matter. For example, restaurant listings may be placed into a separate sub-list that can include further lists List(g) for corresponding listings N-grams. Thus, if a user requests a restaurant listing, only the sub-list for restaurants and corresponding lists may be evaluated in accordance with embodiments of the present invention.

It is recognized that the description of full or short lists and/or sub-lists given above is given by way of example only, and that one of ordinary skill in the art can employ a myriad of other methods or techniques to process information or listings to achieve efficiencies in accordance with embodiments of the present invention.

In one embodiment of the present invention, the N-gram map generator 210 may not be case and/or punctuation sensitive so that punctuation may be removed and capital letters may be changed to lower case letters when N-grams are extracted. In an alternative embodiment, the N-gram map generator 210 may be case and/or punctuation sensitive so that punctuation and capital letters are retained when the N-grams are extracted.

For each listings N-gram, the N-gram map generator 210 may also calculate a listings N-gram frequency score M(g), where g indicates the particular N-gram. In other words, M(g) may designate the number of stored symbol strings L(listings$_{all}$) that contain, for example, N-gram g from the total number M of stored symbol strings L(listings$_{all}$) in the database 110. The listings frequency score M(g) represents the total number of database listings in which the particular listings N-gram g appears. For example, a listings database containing business listings for Morristown, N.J. may contain 5,743 total entries M. Then, listings frequency score M("k_fl") may equal 4 indicating that 4 entries out of 5,743 total entries, for example, contain the N-gram "k_fl." In another example, the frequency score M("ion")") may equal 116 indicating that 116 out of 5,743 total listings contain the N-gram "ion)". The frequency score may be stored in the N-gram database 240 with the corresponding contiguous sequence of N-symbols and the corresponding list of database listings.

Based on the listings N-gram frequency score M(g) and the total number of database listings M, the N-gram map generator 210 may generate a listings N-gram frequency ratio R(g). The frequency ratio R(g) may be the function of the number of the one or more symbol strings stored in the database 110 that contain the listings N-gram g and the total number of the one or more symbol strings L(listings$_{all}$) stored in the database 110.

The frequency ratio R(g) may be calculated by dividing the frequency score M(g) by the total number of database listings M (i.e., R(g)=M(g)/M). The listings N-gram frequency ratio R(g) may be used to evaluate the relative importance of a particular listings N-gram g with respect to its corresponding listings. For example, the listings frequency ratio R("k_fl")=4/5,743 (i.e., M("k_fl")/M). In another example, the listings frequency ratio R("ion)")=116/5,743 (i.e., M("ion)")/M). It should be noted that, the listings N-gram frequency ratio R(g) for a particular listings N-gram can also be evaluated by dividing the number of entries in the corresponding full or short list List(g) by the total number of entries in the listings database M.

The frequency ratio R(g) indicates the frequency by which a particular N-gram g appears in entire database listings (i.e., L(listings$_{all}$)). A lower ratio indicates that the particular N-gram g appears less frequently in the entire database listings. The higher ratio indicates that the particular N-gram g appears more frequently in the entire database listings. The value of the frequency ratio R(g) can be used to evaluate the "distinguishing power" of a particular N-gram g. Thus, the lower the frequency ratio R(g), the more distinguishing power the particular N-gram has.

During an input processing stage, the recognizer 120 may receive a users communication and may generate a list of recognized symbol strings (S$_1$, S$_2$, S$_3$, ... S$_k$) and associated first similarity scores strings (C$_1$, C$_2$, C$_3$, ... C$_k$) from the recognizer 120. In this case, C$_1$ is the first similarity score associated with S$_1$, C$_2$ is the first similarity score associated with S$_2$, etc. The recognizer forwards the list of recognized symbol strings to the rough and fast matcher 220.

In an exemplary embodiment of the present invention, the rough and fast matcher 220 receives the list of recognized symbol strings and associated first similarity scores. The rough and fast matcher 220 may extract one or more recognized N-grams from each of the recognized symbol strings S$_1$ through S$_k$, where N can be, for example, 1, 2, 3, 4, 5, or more symbols or characters in length.

In an embodiment of the present invention, the value of N will be the same length for the recognized symbol strings and the stored symbol strings extracted by the N-gram map generator. In alternative embodiments, the value of N may be different lengths for the recognized symbol strings than the value of N for the stored symbol strings extracted by the N-gram map generator. The value of N may be fixed or may vary in length. In other words, the value of N may be any fixed value such as 1, 2, 3, 4, 5 symbols, etc. Alternatively, the value of N may vary between 1 to 3, 1 to 4, 2 to 5, 3 to 4, 3 to 5, 3 to 6 characters and/or any other range of values or any subset of any range, for example, the value of N may vary over 1, 2, 4, 7 characters.

For every recognized symbol string S$_1$, one or more recognized N-grams $g_1^1, g_1^2 \ldots g_1^{w(1)}$ are extracted, where $g_1^{w(1)}$ is the last N-gram extracted from symbol string S$_1$. Accordingly, for recognized symbol string S$_k$, one or more N-grams $g_k^1, g_k^2, \ldots g_k^{w(k)}$ are extracted, where $g_k^{w(k)}$ is the last N-gram extracted from symbol string S$_k$.

In an exemplary embodiment of the present invention, the rough and fast matcher 220 compares each of recognized N-grams g extracted from the recognized symbol strings with the listings N-grams g stored in the N-gram database 240 to find one or more identical matches. For every database entry stored in the listings database 110 (or every entry in the one or more full or short lists List(g)) mapped to the matched listings N-gram, a second similarity score is created. The rough and fast matcher 220 may generate a preliminary set of symbol strings based on the second similarity score associated with each entry in the preliminary set of symbol strings. The preliminary set of symbol strings may include one or more symbol strings from the full or short lists List(g) that are mapped to the matched listings N-grams. It is recognized that although full or short lists are described herein to narrow down the field of searching that may be required during a processing stage, other techniques can be used by one of ordinary skill in the art to achieve the similar efficiencies. For example, the entire database 110 or sub-sets of the database 110 can be created and/or used to match the N-grams and generate the preliminary set of symbol strings.

In embodiments of the present invention, the second similarity score for a listings symbol string from a preliminary set may be calculated based on elementary second similarity scores, for example, as a sum of the elementary second similarity scores for the recognized and matched N-grams that appear in this listings symbol string. In embodiments of the present invention, the frequency ratio R(g) may be used to generate an N-gram elementary second similarity score ESSS(g) for each of the recognized N-grams. The N-gram elementary second similarity score ESSS(g) may be equal to the frequency ratio R(g), or may be calculated as a function of the frequency ration R(g). For example, the N-gram elementary second similarity score ESSS(g) may be calculated as $-\log(R(g))$ or any other function of the ratio R(g). The calculation of $ESSS(g)=-\log(M(g)/M)$ can be referred to as the information theoretic importance measures which represents information about the listings from the whole listings database symbol strings contained in N-gram g. In alternative embodiments of the present invention, the N-gram elementary second similarity score ESSS(g) for each of the extracted N-grams may be a predetermined fixed value such as 1, 2, 3, etc.

The N-gram elementary second similarity score ESSS(g) for each matched N-gram that belongs to the same stored symbol strings may be added together to generate the second similarity scores. In embodiments of the present invention, the N-gram elementary second similarity scores ESSS(g) for N-grams from different recognized symbol strings that belong to a particular stored symbol string may be multiplied by the first similarity scores associated with the recognized symbol strings and added up to obtain a second similarity score for this particular stored symbol string.

In an embodiment of the present invention, rough and fast matcher takes as input a list of pairs $\{(S_1, C_1), \ldots, (S_k, C_k)\}$, where $S_j$ is the symbol string, $C_i$ is the first similarity score associated with it. Then, for all different listings $listing_j$ from the database, a second similarity score $SSS2(listing_j)$ is computed. For example, the symbol strings $S_i$ are scanned one by one, extracting all N-grams. For example, if, N-gram g is extracted from $S_j$, then for every listing $listing_j$ from the full or short list List(g), the second similarity score SSS2 ($listing_j$) is updated by adding elementary second similarity score ESSS(g) multiplied by the first similarity score of the symbol string $S_j$, that is $C_j$:

$$SSS2(listing_j)=SSS2(listing_j)+ESSS(g)*C_j.$$

In embodiments of the present invention, the starting or initial values of second similarity scores may be set to the same value, for example, 0. Alternatively the starting values of second similarity scores may be different for different listings symbol strings reflecting the a priori information about the probabilities of all listings symbol strings, thus giving some advantage to more probable listings symbol strings.

Once corresponding second similarity scores have been established for one or more stored listings symbol string, a threshold limit, for example, may be established to determine the preliminary set of symbol strings. For example, second similarity score threshold limit may establish that any stored listing symbol string having a corresponding second similarity score that meets or exceeds the threshold may be included in the preliminary set of symbol strings. However, any stored listings symbol string having a corresponding second similarity score that does not meet or exceed the threshold may not be included in the preliminary symbol string set. For example, if the second similarity score threshold is set at 50 points (where 100 points is the highest second similarity score), any stored symbol string having a second similarity score equal to or exceeding 50 points would be included in the preliminary string set. On the other hand, if any stored symbol string has a corresponding second similarity score that is less than, for example, 50 points, then the corresponding stored symbol string may not be included in the preliminary symbol string set.

In embodiments of the present invention, the second similarity threshold may be an absolute threshold or may relative threshold (e.g., relative to the maximum value of the second similarity scores for those stored symbol strings). In alternative embodiments of the present invention, other suitable methods may be used to determine which symbol strings may be included in the preliminary set of symbol strings. For example, the symbol strings with the corresponding top ten (10) highest second similarity scores, for example, may be included in the preliminary set of symbol strings.

In one embodiment of the present invention, the refined matcher 230 receives the preliminary set of symbol strings from the rough and fast matcher 220 and may compute a third similarity score associated with the one or more symbol strings included in the preliminary set of symbol strings. The refined matcher 230 may also receive one or more N-grams associated with entries included in the preliminary set of symbol strings. Based on the third similarity score, the refined matcher 230 may output a refined set of symbol strings. The refined set of symbol strings may include the best or closest match for the user's communication originally received by the recognizer 120.

In embodiments of the present invention, the third similarity score may be determined by evaluating the list of recognized symbol strings with respect to the preliminary set of symbol strings including the one or more stored symbol strings. For each recognized N-gram, the refined matcher 230 may also calculate a refined N-gram frequency score m(g), where g is any N-gram from the recognized symbol string. In other words, m(g) is the number of stored symbol strings included in the preliminary set of symbol strings that contain, for example, recognized N-gram g from the total number m of stored symbol strings included in the preliminary set of symbol strings. The refined N-gram frequency score m(g) represents the number of listings in the preliminary set of symbol strings in which the recognized N-gram g appears.

Based on the refined N-gram frequency score m(g) and a number of listings in the preliminary set of symbol strings m, the refined matcher 230 may generate a refined N-gram frequency ratio r(g). The refined frequency ratio r(g) may be the number of stored symbol strings in the preliminary set of symbol strings that contain the recognized N-gram g divided by a total number of stored symbol strings that appear in the preliminary set of symbol strings.

The refined matcher 230 may calculate the refined frequency ratio r(g) as a ratio of the number of stored symbol strings in the preliminary set of symbol strings that contain the recognized N-gram g and a total number of stored symbol strings that appear in the preliminary set of symbol strings. The refined frequency ratio r(g) may be calculated by dividing the frequency score m(g) by the total number of database listings m (i.e., r(g)=m(g)/m).

The refined frequency ratio r(g) may be used to evaluate the relative importance of a particular N-gram g with respect to the stored listings symbol string in the preliminary set of symbol strings. The refined frequency ratio r(g) indicates the frequency by which a particular N-gram g appears in the preliminary set of symbol strings. A lower ratio indicates that the particular N-gram g appears less frequently in the preliminary set of symbol strings. The higher ratio indicates that the particular N-gram g appears more frequently in the preliminary set of symbol strings. The value of the refined frequency ratio r(g) can be used to evaluate the "distinguishing power" of a particular N-gram g with respect to the preliminary set of symbol strings. Thus, the lower the refined frequency ratio r(g), the more distinguishing power the particular N-gram has.

In embodiments of the present invention, the third similarity score for a stored listing $listing_j$ TSS3($listing_j$) from a preliminary set of symbol strings may be calculated based on elementary third similarity scores ETSS(g), for example, as a sum of the elementary third similarity scores ETSS(g) for the recognized and matched N-grams that appear in this listings symbol string. In embodiments of the present invention, the refined frequency ratio r(g) may be used to generate an N-gram elementary third similarity score ETSS (g) for each of the recognized N-grams. The N-gram elementary third similarity score ETSS(g) may be equal to the refined frequency ratio r(g), or may be calculated as a function of the refined frequency ratio r(g). For example, the elementary third similarity score for an N-gram g ETSS(g) may be calculated as −log(r(g)) or some other function of the refined ratio r(g). The calculation of ETSS(g)=−log(m(g)/m) can be referred to as the information theoretic importance measures which represents information about the listings from the preliminary listings symbol strings contained in N-gram g. In alternative embodiments of the present invention, the N-gram elementary third similarity score ETSS(g) for each of the extracted N-grams may be a predetermined fixed value such as 1, 2, 3, etc.

In an embodiment of the present invention, refined matcher takes as an input a list of pairs $\{(S_1, C_1), \ldots (S_k, C_k)\}$, where $S_i$ is the symbol string and $C_i$ is the first similarity score associated with the symbol string. Then, for all different listings $listing_j$ from the preliminary set, the third similarity score TSS3($listing_j$) is computed. For example, symbol strings $S_i$ may be scanned one by one, extracting all N-grams. For example, if N-gram g is extracted from $S_j$, then for every listing $listing_j$ from the full or short list List(g), the third similarity score TSS3($listing_j$) is updated by adding elementary third similarity score ETSS(g) multiplied by the first similarity score of the symbol string $S_i$, that is $C_i$:

$$TSS3(listing_j)=TSS3(listing_j)+ETSS(g)*C_i.$$

In embodiments of the present invention, the starting values or initial values of third similarity scores may be set to the same value, for example, 0. Alternatively the starting values of third similarity scores may be different for different listings symbol strings reflecting the a priori information about the probabilities of all listings symbol strings, thus giving some advantage to more probable listings symbol strings.

Once corresponding third similarity scores have been established for one or more stored symbol string listings, a threshold limit, for example, may be established to determine the refined set of symbol strings. In embodiments of the present invention, the third similarity score threshold may be an absolute threshold or may relative threshold (e.g., relative to the maximum value of the third similarity scores). In alternative embodiments of the present invention, other suitable methods may be used to determine which symbol strings may be included in the refined set of symbol strings. For example, symbol strings with the corresponding top ten (10) highest third similarity scores, for example, may be included in the refined set of symbol strings.

In further embodiments of the invention, further processing may occur by evaluating the recognized symbol strings with respect to the refined set of symbol strings before an output is presented to the user in the same way as it is done with the preliminary set of symbol strings. Thus, a more refined set of symbol strings can be achieved. This process can be implemented repeatedly in accordance with embodiments of the present invention.

In embodiments of the present invention, the refined matcher outputs the refined set of symbol strings to the output manager 130 for processing. Depending on the distribution of the third similarity scores for symbol strings from the refined set and/or some other similarity measures like Levenstein distance between the recognized symbol strings and the symbol strings from the refined set, the output manager 130 may take a decision about what listing the user meant and it may route a call for the user, retrieve and/or present the requested information.

Depending on the same distributions, the output manager 130 may forward the refined set of symbol strings to the user for selection. Based on the user's selection, the output manager 130 may route a call for the user, retrieve and present the requested information.

Depending on the same distributions, the output manager 130 may present another prompt to the user, terminate the call if the desired results have been achieved, or perform other steps to output a desired result for the user. If the output manager 130 presents another prompt to the user, for example, asks the user to input the desired listings name once more, the new recognized symbol strings may be used to help the output manager to make the final decision about the user's goal. This can be done by changing the distribution of the third similarity scores by, for example, adding up third similarity scores for symbol strings from the refined set of symbol strings computed based on the first user input and third similarity scores for symbol strings from the refined set of symbol strings computed based the second user input.

Figure 2:
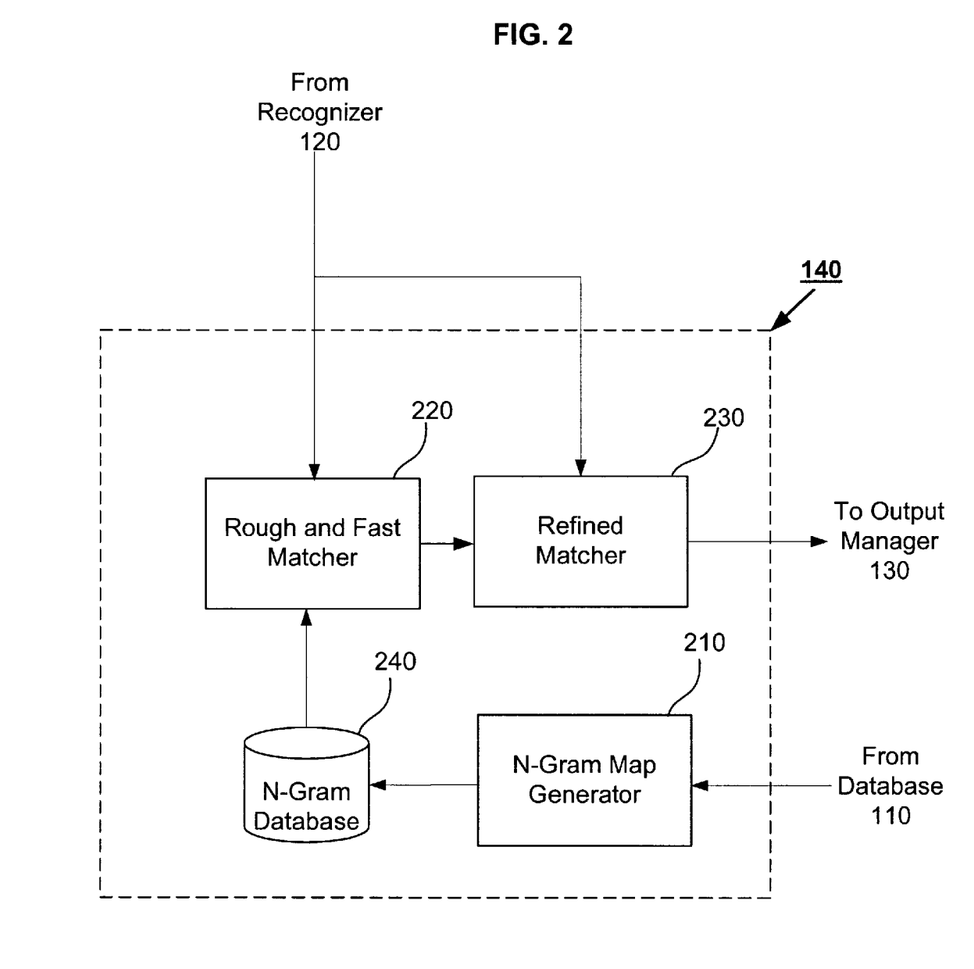
FIG. 2 is a detailed block diagram of a database entry matcher, shown in FIG. 1, in accordance with an exemplary embodiment of the present invention.

It is recognized that the configuration of the communication(s) processing system 100 and the database entry matcher 140 as shown in FIGS. 1 and 2, and the corresponding description above, is given by example only and modifications can be made to the communication(s) processing system 100 and to the database entry matcher 140 that fall within the spirit of the invention. For example, in alternative embodiments of the invention, the database entry matcher 140 and/or its functionality may be incorporated into the recognizer, the output manager and/or any combination(s) may be formed. In yet further embodiments of the present invention, the intelligence of the communication(s) processing system 100 may be integrated into one or more application specific integrated circuits (ASICs) and/or one or more software programs. In another example, the N-gram map generator 210, the rough and fast matcher 220, and/or the refined matcher 230 may also be combined into one or more hardware or software components. Embodiments of the present invention can be employed in known and/or new Internet search engines, for example, to search the World Wide Web.

Figure 3:
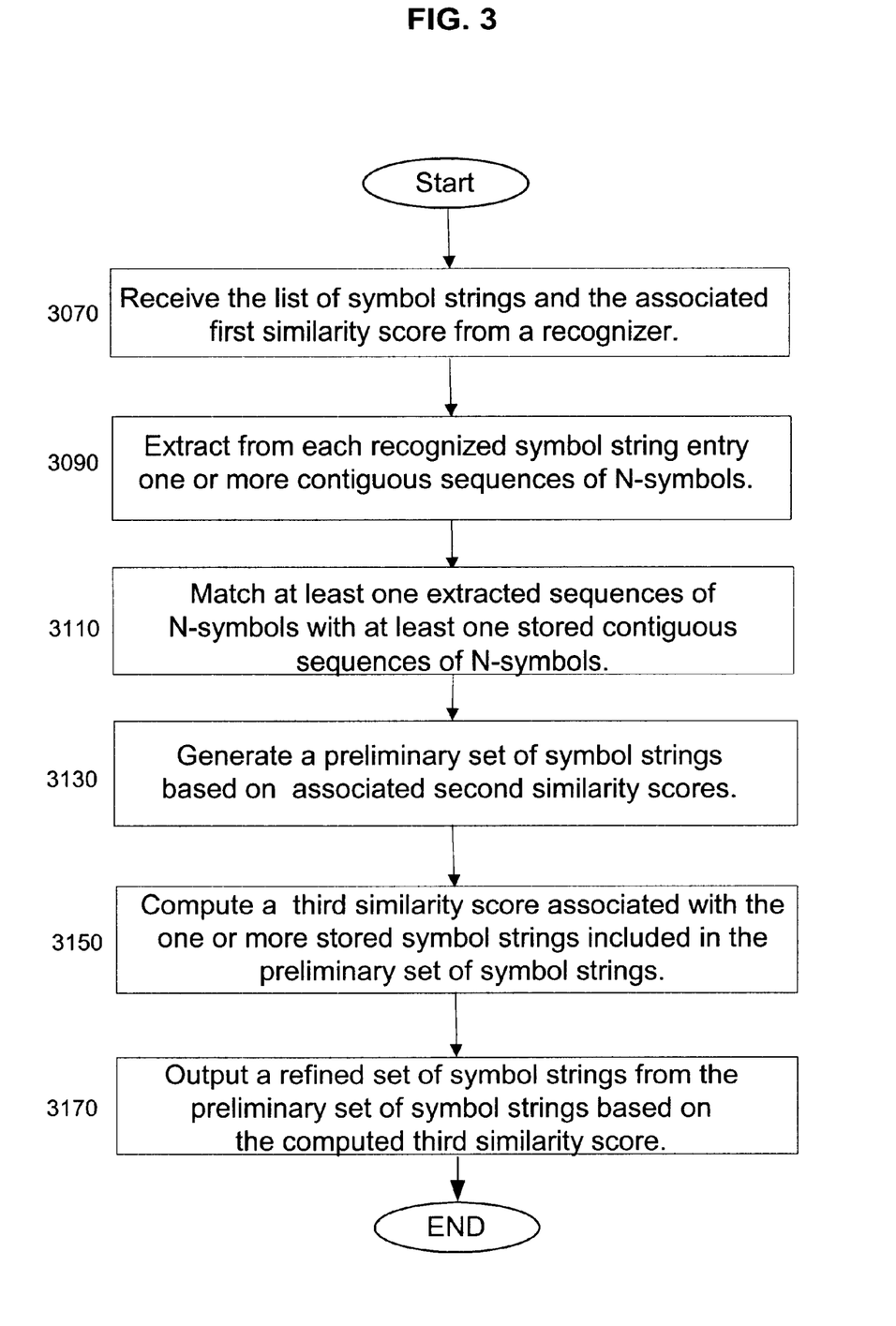
FIG. 3 is a flowchart illustrating an automatic input recognition process in accordance with an exemplary embodiment of the present invention.
Figure 4:
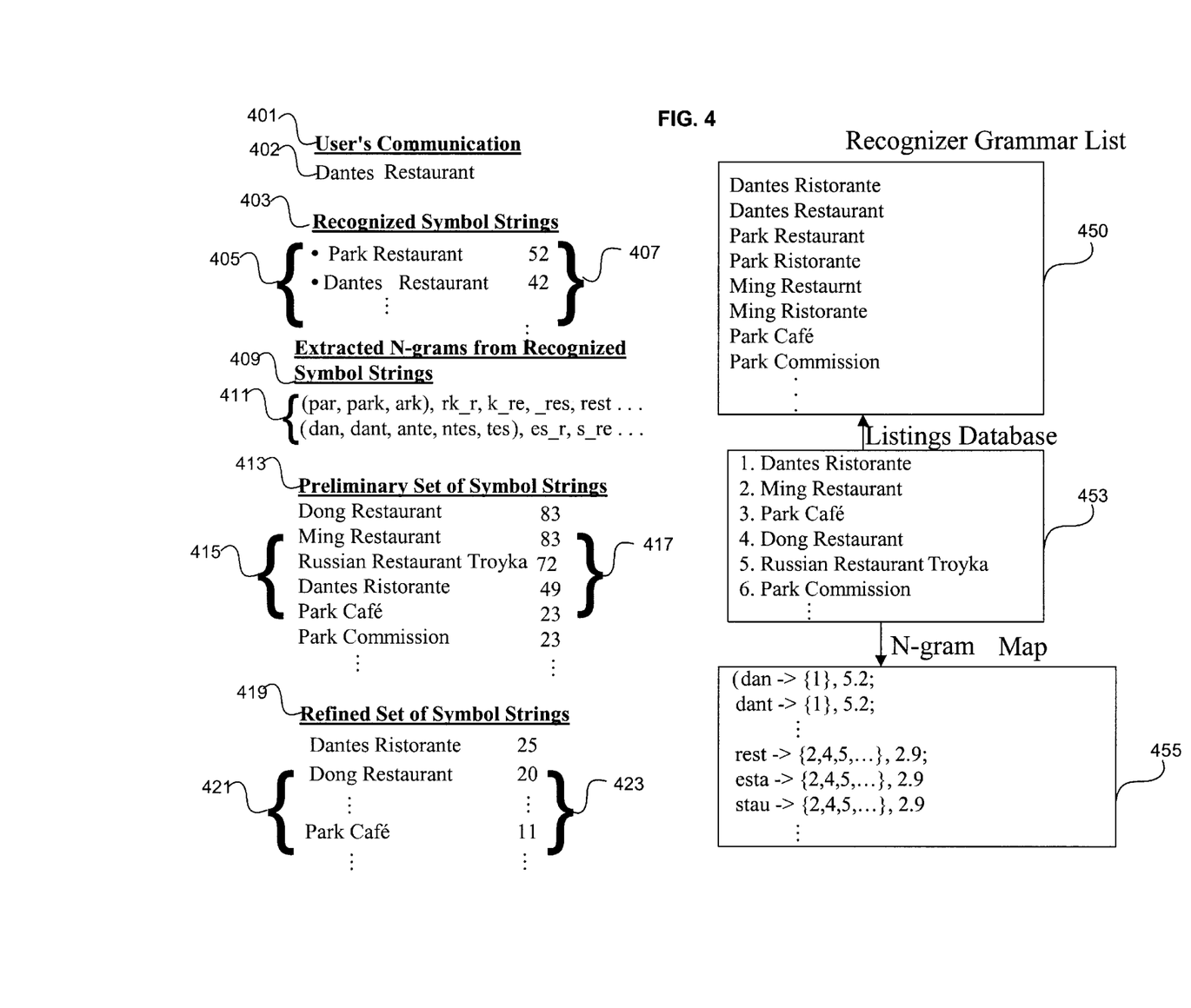
FIG. 4 illustrates the application of the automatic input recognition process to an exemplary input in accordance with an embodiment of the present invention.

Referring now to FIGS. 3 and 4, the method for automatically recognizing a user's communication in accordance with exemplary embodiments of the present invention will now be described. FIG. 4 illustrates a flow chart of a method in accordance with an exemplary embodiment of the present invention. FIG. 4 is an example of a user's communication that is processed in accordance with the method described in the flow chart of FIG. 3. A user may call, for example, directory assistance to locate the telephone number, address and/or other information for a particular individual, organization, agency, business, etc. After the call is completed, an automated communication processing system 100, for example, may receive the call and request the user to enter a search criteria. The communication processing system 100 may include an automated attendant, an IVR or other suitable automated answering service. The search criteria could be, for example, the name of a business for which additional information is required. The search criteria could be a user's communication that can be spoken inputs, inputs entered via a keypad or keyboard, or other suitable inputs.

The recognizer 120 located in the communication processing system 100 may receive a user's communication. As shown, in FIG. 4, for example, the user's communication 401 may be a spoken request "Dantes Restaurant" 402 in response to a request for the search criteria from the communication processing system 100. The recognizer 120 may search the recognizer grammar list 450 created from the recognizer listings database 453 for an N-best match. The recognizer grammar list 450 and the listings database may be stored in, for example, the database 110. In this example, the listings database 453 contains a plurality of symbol strings representing, for example, names of local restaurants. The recognizer grammar list 450 include entries that represent the different ways users may refer to the symbol strings stored in the listings database 453.

In embodiments of the present invention, the N-gram map generator 210 may extract one or more contiguous sequence of N-symbols (listings N-grams) from the plurality of symbol strings stored in the listings database 453. The N-gram map generator may create an N-gram map 455 containing the extracted contiguous sequences of N-symbols that are mapped to corresponding symbol strings stored in the listings database 453. The N-gram map 455 may be stored in, for example, N-gram database 240.

The recognizer 120 may generate a list of recognized symbol strings 403 including one or more recognized entries 405 based on the received user's communication 402 and may compute the associated first similarity scores 407 for the one or more recognized entries. The recognizer 120 may transmit the list of recognized symbol string entries 405 and the associated first similarity scores 407 to the database entry matcher 140. The rough and fast matcher 220, located in the database entry matcher 140, receives the list of recognized symbol strings 405 and the associated first similarity scores 407 (3070).

The rough and fast matcher 220 extracts from each of the recognized symbol strings 405, in the list of recognized symbol strings 403, one or more contiguous sequences of N-symbols 411 (recognized N-grams) (3090). The rough and fast matcher 220 may match at least one of the extracted contiguous sequence of N-symbols 411 with the at least one stored contiguous sequence of N-symbols from the N-gram map 455 stored in the N-gram database 240 (3110). The rough and fast matcher 220 further generates a preliminary set of symbol strings 413 based on the associated second similarity scores 417 (3130). The preliminary set of symbol strings 413 may include one or more stored symbol strings from the listings database 453 that correspond to the matched contiguous sequence of N-symbols.

The refined matcher computes the third similarity scores 423 associated with the one or more stored symbol strings 415 included in the preliminary set of symbol strings 413 and outputs a refined set of symbol strings 421 (3150). The refined set of symbol strings 421 may be output based on the computed third similarity scores 423 (3170).

In embodiments of the present invention, the refined set of symbol strings 421 may be output to the output manager 130. In an exemplary embodiment, the output manager may directly output the refined set of symbol strings 421 to the user for selection. In embodiments of the present invention, the output manager 130, for example, may retrieve additional information corresponding to the user's selection and present such information to the user. Such additional information may include, for example, a corresponding telephone number, mailing address, e-mail address, etc. This additional information may be located in, for example, database 110 and/or any other informational database. In alternative embodiments of the invention, the output manager may offer to connect the user with the selection if the user is satisfied with the resulting set of symbol strings presented. However, if the user is unsatisfied, the output manager 130 may return refined set of symbol strings 421 to the refined matcher 230 and/or rough and fast matcher 230 for further processing in accordance with embodiments of the present invention.

It is recognized that any suitable hardware, software, and/or any combination thereof may be used to implement the above-described embodiments of the present invention. The systems and/or apparatus shown in FIGS. 1–2 and described in corresponding text, and the methods shown in FIGS. 3–4 and described in corresponding text can be implemented using hardware and/or software that are well within the knowledge and skill of persons of ordinary skill in the art.

Several embodiments of the present invention are specifically illustrated and/or described herein. However, it will be appreciated that modifications and variations of the present invention are covered by the above teachings and are within the purview of the appended claims without departing from the spirit and intended scope of the invention.

We claim:

1. A method for processing a user's communication comprising:

receiving a list of recognized symbol strings of one or more recognized entries and a first similarity score associated with each recognized entry;

extracting from each recognized symbol string one or more contiguous sequences of N-symbols;

matching at least one of the extracted contiguous sequence of N-symbols with at least one stored contiguous sequence of N-symbols from a first database;

generating a preliminary set of symbol strings and associated second similarity scores, the preliminary set of symbol strings including one or more stored symbol strings from a second database that correspond to the at least one of the matched contiguous sequence of N-symbols;

computing a third similarity score associated with the one or more stored symbol strings included in the preliminary set of symbol strings; and outputting a refined set of symbol strings from the preliminary set of symbol strings based on the computed third similarity score.

2. The method of claim 1, wherein the extracted contiguous sequences of N-symbols and stored contiguous sequences of N-symbols include at least four symbols.

3. The method of claim 2, wherein the extracted contiguous sequences of N-symbols and stored contiguous sequences of N-symbols are of a fixed length.

4. The method of claim 1, wherein the extracted contiguous sequences of N-symbols and stored contiguous sequences of N-symbols include at least one of a one, two, three, four, five and six symbols.

5. The method of claim 4, wherein the extracted contiguous sequences of N-symbols and stored contiguous sequences of N-symbols are of the same fixed length.

6. The method of claim 1, wherein the extracted contiguous sequences of N-symbols and stored contiguous sequences of N-symbols range from at least three to six symbols.

7. The method of claim 1, wherein the lengths of the extracted contiguous sequences of N-symbols and stored contiguous sequences of N-symbols are at least one of a fixed value, a range of values and a subset of the range of values.

8. The method of claim 1, further comprising:
generating from a received user's communication the list of recognized symbol strings of the one or more recognized entries; and
computing the first similarity score associated with each recognized entry contained in the generated list of recognized symbol strings.

9. The method of claim 1, wherein the third similarity score is computed based on associated information theoretic importance measures.

10. The method of claim 9, wherein the associated information theoretic importance measures is calculated using the formula: $-\log(m(g)/m)$, where $m(g)$ represents refined N-gram frequency scores and m represents number of stored symbol strings included in the preliminary set of symbol strings.

11. The method of claim 1, wherein the second similarity score is computed based on associated information theoretic importance measures.

12. The method of claim 11, wherein the associated information theoretic importance measures is calculated using the formula: $-\log(M(g)/M)$, where $M(g)$ represents listings N-gram frequency scores and M represents total number of stored symbol strings in the second database.

13. The method of claim 1, further comprising:
extracting from the one or more symbol strings stored in the second database the at least one stored contiguous sequence of N-symbols.

14. The method of claim 13, further comprising:
mapping the extracted at least one stored contiguous sequence of N-symbols with corresponding one or more symbol strings stored in the second database.

15. The method of claim 14, further comprising:
storing mapping information relating at least one of the stored contiguous sequences of N-symbols to the corresponding one or more symbol strings stored in the second database and the second similarity scores associating this particular stored contiguous sequence of N-symbols with the corresponding symbol strings containing it.

16. The method of claim 1, further comprising:
computing the associated second similarity scores for the one or more symbol strings stored in the second database included in the preliminary set of symbol strings as a function of at least a number of the contiguous sequences of N-symbols from the list of recognized symbol strings of one or more recognized entries encountered in the symbol string for which the associated second similarity score is being computed.

17. The method of claim 1, further comprising:
computing the associated second similarity scores for the one or more symbol strings stored in the second database included in the preliminary set of symbol strings based on at least a ratio of a number of the one or more symbol strings stored in the second database that contain the matched stored contiguous sequence of N-symbols and a total number of the one or more symbol strings stored in the second database.

18. The method of claim 1, further comprising:
computing the associated third similarity score as a function of at least a number of the one or more contiguous sequences of N-symbols extracted from each recognized symbol string that appear in the one or more symbol strings stored in the second database included in the preliminary set of symbol strings.

19. The method of claim 1, further comprising:
computing the third similarity score based on a ratio of a number of the one or more symbol strings stored in the second database included in the preliminary set of symbol strings containing the extracted contiguous sequences of N-symbols and a total number of stored symbol strings that appear in the preliminary set of symbol strings.

20. A machine-readable medium having stored thereon a plurality of executable instructions, the plurality of instructions comprising instructions to:
receive a list of recognized symbol strings of one or more recognized entries and a first similarity score associated with each recognized entry;
extract from each recognized symbol string one or more contiguous sequences of N-symbols;
match at least one of the extracted contiguous sequence of N-symbols with at least one stored contiguous sequence of N-symbols from a first database;
generate a preliminary set of symbol strings and associated second similarity scores, the preliminary set of symbol strings including one or more stored symbol strings from a second database that correspond to the at least one of the matched contiguous sequence of N-symbols;
compute a third similarity score associated with the one or more stored symbol strings included in the preliminary set of symbol strings; and
output a refined set of symbol strings from the preliminary set of symbol strings based on the computed third similarity score.

21. The machine-readable medium of claim 20 having stored thereon additional executable instructions, the additional instructions comprising instructions to:
generate from a received user's communication the list of recognized symbol strings of the one or more recognized entries; and
compute the first similarity score associated with each recognized entry contained in the generated list of recognized symbol strings.

22. The machine-readable medium of claim 20 having stored thereon additional executable instructions, the additional instructions comprising instructions to:
 extract from the one or more symbol strings stored in the second database the at least one stored contiguous sequence of N-symbols.

23. The machine-readable medium of claim 22 having stored thereon additional executable instructions, the additional instructions comprising instructions to:
 map the extracted at least one stored contiguous sequence of N-symbols with corresponding one or more symbol strings stored in the second database.

24. The machine-readable medium of claim 23 having stored thereon additional executable instructions, the additional instructions comprising instructions to:
 storing mapping information relating at least one of the stored contiguous sequences of N-symbols to the corresponding one or more symbol strings stored in the second database and the second similarity scores associating this particular stored contiguous sequence of N-symbols with the corresponding symbol strings containing it.

25. The machine-readable medium of claim 20 having stored thereon additional executable instructions, the additional instructions comprising instructions to:
 compute the associated second similarity scores for the one or more symbol strings stored in the second database included in the preliminary set of symbol strings as a function of at least a number of the contiguous sequences of N-symbols from the list of recognized symbol strings of one or more recognized entries encountered in the symbol string for which the associated second similarity score is being computed.

26. The machine-readable medium of claim 20 having stored thereon additional executable instructions, the additional instructions comprising instructions to:
 compute the associated second similarity scores for the one or more symbol strings stored in the second database included in the preliminary set of symbol strings based on at least a ratio of a number of the one or more symbol strings stored in the second database that contain the matched stored contiguous sequence of N-symbols and a total number of the one or more symbol strings stored in the second database.

27. The machine-readable medium of claim 20 having stored thereon additional executable instructions, the additional instructions comprising instructions to:
 compute the associated third similarity score as a function of at least a number of the one or more contiguous sequences of N-symbols extracted from each recognized symbol string that appear in the one or more symbol strings stored in the second database included in the preliminary set of symbol strings.

28. The machine-readable medium of claim 20 having stored thereon additional executable instructions, the additional instructions comprising instructions to:
 compute the third similarity score based on a ratio of a number of the one or more symbol strings stored in the second database included in the preliminary set of symbol strings containing the extracted contiguous sequences of N-symbols and a total number of stored symbol strings that appear in the preliminary set of symbol strings.

29. An apparatus for processing a user's communication comprising:
 an N-gram map generator to extract one or more contiguous sequences of N-symbols from a list of recognized symbol strings of one or more recognized entries;
 a first matcher to match at least one of the extracted contiguous sequence of N-symbols with at least one stored contiguous sequence of N-symbols and the first matcher further generates a preliminary set of symbol strings and associated second similarity scores, the preliminary set of symbol strings including one or more stored symbol strings that correspond to the matched contiguous sequence of N-symbols;
 a second matcher to compute a third similarity score corresponding to the one or more stored symbol strings included in the preliminary set of symbol strings; and
 an output manager to output a refined set of symbol strings from the preliminary set of symbol strings based on the computed third similarity score.

30. The apparatus of claim 29, the further comprising:
 a first database to store a plurality of symbol string entries used to process the user's communication.

31. The apparatus of claim 30, wherein the N-gram map generator further extracts from each entry in the first database at least one stored contiguous sequence of N-symbols contained in each entry and the apparatus further comprises:
 a second database to store the at least one stored contiguous sequence of N-symbols and a mapping for the corresponding database entries.

32. The apparatus of claim 30, wherein N-gram map generator further maps one or more stored contiguous sequences of N-symbols to at least one of the plurality of stored database entries that contain the one or more stored contiguous sequence of N-symbols.

33. The apparatus of claim 29, wherein the first matcher is to compute the associated second similarity scores for the preliminary set of symbol strings based on at least a ratio of a number of the one or more stored symbol strings from the first database that contain the stored contiguous sequence of N-symbols and a total number of the one or more stored symbol strings in the first database.

34. The apparatus of claim 29, wherein the second matcher is to compute the associated third similarity scores for the preliminary set of symbol strings based on at least a ratio of a number of the one or more stored symbol strings included in the preliminary set of symbol strings containing the extracted contiguous sequence of N-symbols and a total number of the one or more stored symbol strings included in the preliminary set of symbol strings.

35. The apparatus of claim 29, the further comprising:
 a recognizer to generate the list of recognized symbol strings of one or more recognized entries from received user's communication and to compute a first similarity scores associated with each entry of the generated list of recognized symbol strings.

36. The apparatus of claim 29, wherein the extracted sequences of N-symbols and the stored contiguous sequences of N-symbols include at least four symbols.

37. The apparatus of claim 36, wherein the extracted sequences of N-symbols and the stored contiguous sequences of N-symbols are of a fixed length.

38. The apparatus of claim 29, wherein the extracted sequences of N-symbols and the stored contiguous sequences of N-symbols include at least one of a one, two, three, four, five and six symbols.

39. The apparatus of claim 38, wherein the extracted sequences of N-symbols and the stored contiguous sequences of N-symbols are of the same fixed length.

40. The apparatus of claim 29, wherein the lengths of the extracted contiguous sequences of N-symbols and stored contiguous sequences of N-symbols are at least one of a fixed value, a range of values and a subset of the range of values.

41. The method for processing a user's communication comprising:

extracting one or more listings N-gram from each symbol string entry in a listings data base;

mapping one or more particular listings N-gram from the one or more listings N-gram with a list of listings symbol strings that contain the particular listings N-gram;

calculating an elementary second similarity score for each entry in the list of listings symbol strings that contain the particular listings N-gram;

receiving a list of recognized symbol strings of one or more recognized entries and a first similarity score associated with each recognized entry;

extracting from each recognized symbol string one or more recognized N-grams;

matching at least one of the recognized N-grams with at least one particular listings N-gram from the one or more particular listings N-gram mapped to the list of listings symbol strings;

generating a preliminary set of symbol strings and associated second similarity scores, the preliminary set of symbol strings including one or more symbol strings from the list of listings symbol strings mapped to the at least one of the matched particular listings N-gram;

computing a third similarity score associated with the one or more symbol strings included in the preliminary set of symbol strings; and outputting a refined set of symbol strings from the preliminary set of symbol strings based on the computed third similarity score.

42. The method of claim 41, further comprising:

calculating a listings N-gram frequency score for the one or more mapped particular listings N-gram, wherein the listings N-gram frequency score represents a number of symbol string entries in the listings database in which the particular N-gram appears.

43. The method of claim 42, further comprising:

calculating an listings N-gram frequency ratio for the one or more mapped particular listings N-gram by dividing the listings N-gram frequency score by a total number of symbol string entries in the listings database.

44. The method of claim 43, wherein the elementary second similarity score for each N-gram is based on the calculated listings N-gram frequency ratio and the associated second similarity scores for symbol strings are calculated based on corresponding elementary second similarity scores for N-grams from the recognized symbol strings contained in these symbol strings.

45. The method of claim 41, wherein the preliminary set of symbol strings is generated based on an established threshold limit of the associated second similarity scores.

46. The method of claim 41, wherein the list of listings symbol strings that contain the particular listings N-gram is a full list.

47. The method of claim 41, wherein the list of listings symbol strings that contain the particular listings N-gram is a short list.

48. The method of claim 41, further comprising:

calculating a refined frequency score for the one or more recognized N-grams, wherein the refined frequency score represents a number of symbol string entries contained in the preliminary set of symbol strings that contain the recognized N-gram.

49. The method of claim 48, further comprising:

calculating a refined N-gram frequency ratio for the one or more recognized N-grams by dividing the refined frequency score by a total number of symbol string entries contained in the preliminary set of symbol strings.

50. The method of claim 49, further comprising:

calculating an elementary third similarity score for a recognized N-gram and each entry in the preliminary set of symbol strings that contain the recognized N-gram.

51. The method of claim 50, wherein the elementary third similarity score for the recognized N-gram and each entry in the preliminary list of symbol strings that contain the recognized N-gram is based on the calculated refined N-gram frequency ratio and the associated third similarity scores are calculated based on corresponding elementary third similarity scores.

52. The method of claim 41, further comprising:

generating a refined set of symbol strings is based on an established refined threshold limit of the associated third similarity scores.

53. An apparatus for processing a user's communication comprising:

an N-gram map generator extracts one or more listings N-gram from each symbol string entry in a listings database, maps one or more particular listings N-gram from the one or more listings N-gram with a list of listings symbol strings that contain the particular listings N-gram and calculates an elementary second similarity score for each entry in the list of listings symbol strings that contain the particular listings N-gram;

a first matcher receives a list of recognized symbol strings of one or more recognized entries and a first similarity score associated with each recognized entry, extracts from each recognized symbol string one or more recognized N-grams, matches at least one of the recognized N-grams with at least one particular listings N-gram from the one or more particular listings N-gram mapped to the list of listings symbol strings and generates a preliminary set of symbol strings and associated second similarity scores, the preliminary set of symbol strings including one or more symbol strings from the list of listings symbol strings mapped to the at least one of the matched particular listings N-gram; and a second matcher computes a third similarity score associated with the one or more symbol strings included in the preliminary set of symbol strings and outputs a refined set of symbol strings from the preliminary set of symbol strings based on the computed third similarity score.

54. The apparatus of claim 53, the N-gram map generator further calculates a listings N-gram frequency score for the one or more mapped particular listings N-gram, wherein the listings N-gram frequency score represents a number of symbol string entries in the listings database in which the particular N-gram appears.

55. The apparatus of claim 54, the N-gram map generator further calculates a listings N-gram frequency ratio for the one or more mapped particular listings N-gram by dividing the listings N-gram frequency score by a total number of symbol string entries in the listings database.

56. The apparatus of claim 53, further comprising:

an N-gram database stores the one or more listings N-gram and the mapped list of listings symbol strings that contain the particular listings N-gram.

57. The apparatus of claim 53, the second matcher further calculates a refined frequency score for the one or more recognized N-grams, wherein the refined frequency score represents a number of symbol string entries contained in the preliminary set of symbol strings that contain the recognized N-gram.

58. The apparatus of claim 57, the second matcher further calculates a refined N-gram frequency ratio for the one or more recognized N-grams by dividing the refined frequency score by a total number of symbol string entries contained in the preliminary set of symbol strings.

59. The apparatus of claim 53, the second matcher further calculates an elementary third similarity score for a recognized N-gram and each entry in the preliminary set of symbol strings that contain the recognized N-gram.

60. A machine-readable medium having stored thereon a plurality of executable instructions, the plurality of instructions comprising instructions to:

extract one or more listings N-gram from each symbol string entry in a listings database;

map one or more particular listings N-gram from the one or more listings N-gram with a list of listings symbol strings that contain the particular listings N-gram;

calculate an elementary second similarity score for each entry in the list of listings symbol strings that contain the particular listings N-gram;

receive a list of recognized symbol strings of one or more recognized entries and a first similarity score associated with each recognized entry;

extract from each recognized symbol string one or more recognized N-grams;

match at least one of the recognized N-grams with at least one particular listings N-gram from the one or more particular listings N-gram mapped to the list of listings symbol strings;

generate a preliminary set of symbol strings and associated second similarity scores, the preliminary set of symbol strings including one or more symbol strings from the list of listings symbol strings mapped to the at least one of the matched particular listings N-gram;

compute a third similarity score associated with the one or more symbol strings included in the preliminary set of symbol strings; and output a refined set of symbol strings from the preliminary set of symbol strings based on the computed third similarity score.

61. The machine-readable medium of claim 60 having stored thereon additional executable instructions, the additional instructions comprising instructions to:

calculate a listings N-gram frequency score for the one or more mapped particular listings N-gram, wherein the listings N-gram frequency score represents a number of symbol string entries in the listings database in which the particular N-gram appears.

62. The machine-readable medium of claim 61 having stored thereon additional executable instructions, the additional instructions comprising instructions to:

calculate a listings N-gram frequency ratio for the one or more mapped particular listings N-gram by dividing the listings N-gram frequency score by a total number of symbol string entries in the listings database.

63. The machine-readable medium of claim 60 having stored thereon additional executable instructions, the additional instructions comprising instructions to:

calculate a refined frequency score for the one or more recognized N-grams, wherein the refined frequency score represents a number of symbol string entries contained in the preliminary set of symbol strings that contain the recognized N-gram.

64. The machine-readable medium of claim 63 having stored thereon additional executable instructions, the additional instructions comprising instructions to:

calculate a refined N-gram frequency ratio for the one or more recognized N-grams by dividing the refined frequency score by a total number of symbol string entries contained in the preliminary set of symbol strings.

65. The machine-readable medium of claim 64 having stored thereon additional executable instructions, the additional instructions comprising instructions to:

calculate an elementary third similarity score for a recognized N-gram and each entry in the preliminary set of symbol strings that contain the recognized N-gram.

66. The machine-readable medium of claim 60 having stored thereon additional executable instructions, the additional instructions comprising instructions to:

generate a refined set of symbol strings is based on an established refined threshold limit of the associated third similarity scores.

* * * * *